United States Patent [19]

Glaser et al.

[11] Patent Number: 4,552,454
[45] Date of Patent: Nov. 12, 1985

[54] SYSTEM AND METHOD FOR DETECTING A PLURALITY OF TARGETS

[75] Inventors: Michael S. Glaser, Redondo Beach; James R. Rochester, Arcadia, both of Calif.

[73] Assignee: Hughes Aircraft Company, El Segundo, Calif.

[21] Appl. No.: 464,823

[22] Filed: Feb. 8, 1983

[51] Int. Cl.[4] .............................................. G01C 3/08
[52] U.S. Cl. .......................................... 356/5; 356/6; 434/4; 434/5
[58] Field of Search ....................... 356/5, 6; 434/4, 5; 350/96.21

[56] References Cited

U.S. PATENT DOCUMENTS

| | | | |
|---|---|---|---|
| 3,981,592 | 9/1976 | Williams | 356/5 |
| 4,068,952 | 1/1978 | Erbert et al. | 356/5 |
| 4,121,890 | 10/1978 | Braun | 356/5 |
| 4,320,968 | 3/1982 | Wakabayashi et al. | 356/5 |
| 4,432,640 | 2/1984 | Grage et al. | 356/5 |
| 4,451,146 | 5/1984 | Grage et al. | 356/5 |

FOREIGN PATENT DOCUMENTS 1538316  7/1979  United Kingdom .................... 356/5

Primary Examiner—S. C. Buczinski
Assistant Examiner—Linda J. Wallace
Attorney, Agent, or Firm—Lewis B. Sternfels; A. W. Karambelas

[57] ABSTRACT

A test system (10) for a laser rangefinder (12, 14) having signal transmission and reception paths comprises a thick lens collimator (20) which receives energy (18) from a transmitter (12) for input through an optical fiber (32). The fiber has a partial reflector (34) and a full reflector (38) to simulate sites of targets, and the reflected energy is transmitted back through collimator (20) to a receiver (14). Partial reflection of energy is provided by gold (64) placed on a surface (53) of one of two aligned and spaced termini (32a, 32b) of fiber (32).

18 Claims, 2 Drawing Figures

SYSTEM AND METHOD FOR DETECTING A PLURALITY OF TARGETS

BACKGROUND OF THE INVENTION

1. Field of the Invention

The present invention relates to a system and method for detecting two or more targets positioned at different sites and, in its preferred use, to an optical device which tests laser rangefinders in which spaced apart simulated optical range targets produce multiple reflections from a single input pulse of electromagnetic energy.

2. Description of the Prior Art

While the present invention has particular application to testing of optical rangefinders, it is to be understood that it is equally useful to detect a plurality of targets positioned at different sites. Nevertheless, specific discussion will be directed toward such testing, for which the invention was specifically devised.

Inventions relating to such rangefinder testing are described in U.S. Pat. Nos. 4,068,952 patented Jan. 17, 1978 and 4,121,890 patented Oct. 24, 1978. As stated in the former patent, rangefinders, specifically laser rangefinders, have been conventionally tested in outdoor target ranges. Such testing is generally inconvenient and/or hazardous. The equipment must be moved to the range where personnel may be harmed as a result of accidental exposure to the laser beam. In addition, the environment produces variations of optical transmissivity from moisture, dust and other pollutants. In was thus an object of the invention of U.S. Pat. No. 4,068,952 to eliminate such inconvenience and hazards by bringing a laser rangefinder test unit to the laser itself.

The optical range tester described therein includes a coil of an optical waveguide, such as a single optical fiber, input and output focusing lenses and a multiple tapping unit for extracting or sampling light energy from the fiber at a number of predetermined points along the coil to provide different time delays corresponding to minimum, nominal and range resolution returns. All of the sampled output beams are combined optically so that they leave the device on a common optical axis so as to be sensed by an optical detector in the laser receiver. The multiple tapping unit includes a reflection system coupled to a discontinuity in the optical fiber which forms an input and an output. Diffused energy from the input fiber is reflected for sampling, while the remainder of the energy continues to down line sampling stations through the output fiber. That system has worked well in providing a capability to detect such closely placed targets.

An alternate sampling method for reflecting a portion of the laser energy to provide at least dual target capability is provided by splicing together two spools of fibers having cores of different diameters. The spool closest to the furthest target has the smaller diameter core so that a reflection is provided by the core-to-cladding interface at the splice junction. Such a splice is difficult to produce and produces stress in the fiber, leading to breakage.

The greatest disadvantage to such a splice is that it is very inefficient. The reflection coefficient is 0.05%, with 74% of the energy being absorbed, and only 25% of the energy being transmitted. The transmitted light reflected from the furthest placed target to the rangefinder has a reflection coefficient of 4%.

Such inefficiency in transmission of the energy produces a situation in which the thick lens collimator described in U.S. Pat. No. 4,121,890 can be and has been damaged. Energy is transmitted at a relatively high level and, to prevent it from damaging the collimator, it is conventional to decrease the energy by placing a dense filter in front of the collimator. However, because of the energy loss in the splice, the intensity of the laser energy cannot be decreased to too great an extent; otherwise there would be too little energy transmitted, and reflected back, through the splice for proper test system response. Accordingly, a less dense filter is employed which exposes the collimator to potential damage.

SUMMARY OF THE INVENTION

The present invention avoids these and other problems by utilizing a partial reflector at a discontinuity of a fiber having a single core diameter. Preferably, the discontinuity comprises a break in the fiber whose ends at the break are optically polished and aligned for minimum loss, and one of the ends is coated with a partially reflective material of low absorption.

Several advantages are derived therefrom. Primarily, the partial reflector reflects a portion of the energy while permitting transmission of substantially the remaining portion of the energy. Consequently, there is little loss of energy reflected back from both the partial reflector and full reflector; therefore, the test system efficiency is increased. As a result, a dense filter may be employed to protect any thick lens collimator used.

Other aims and advantages, as well as a more complete understanding of the present invention, will appear from the following explanation of an exemplary embodiment and the accompanying drawings thereof.

DETAILED DESCRIPTION OF THE INVENTION

Figure 1:
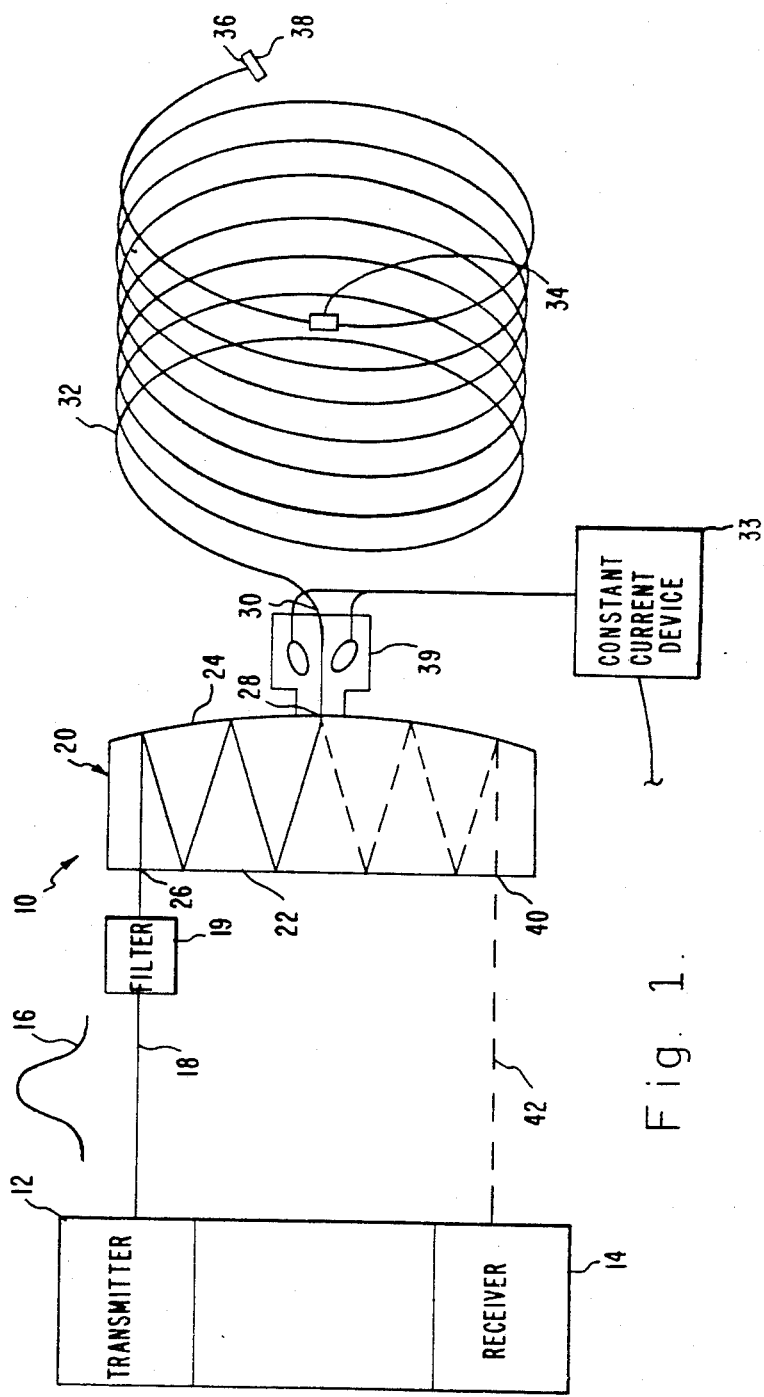
FIG. 1 is a schematic diagram of the preferred arrangement of the invention taken in conjunction with optical simulated range test laser unit.

Referring to FIG. 1, an optical range boresight test unit 10 operates with an optical rangefinder, such as a laser rangefinder, which includes a laser transmitter 12 and a laser receiver 14. A transmitted pulse or a signal of laser energy shown by a waveform 16 is applied from transmitter 12 as a beam 18 through a filter 19 to an optical structure 20, such as a thick lens collimator having a partially reflecting first surface 22 and a highly reflecting second surface 24. Waveform 16 enters a first end 26 of first surface 22 and its pulse proceeds through optical structure 20 to its second surface 24. The illustrated path in FIG. 1 is that of a typical light ray. After several internal reflections within structure 20, some of the light is gradually focused to a focal point 28 on second surface 24 due to the focussing power of surfaces 22 and 24. In practice, the optical structure is designed to provide minimum beam diameter at focal point 28, where it is injected as a beam into an input end 30 of a single optical fiber or optical waveguide 32. A constant current device 33 helps to control the input of the light into a reticle 39 which designates the fiber entrance position. Fiber 32 may comprise a conventional optical glass fiber containing a step or a graduated change in the refracted index of the glass between the core and the outer regions so that the light, propagated along the fiber, is guided in the core region of the fiber. For the purpose of this invention, an optical fiber means any optical waveguide glass fiber or fiber of any suitable material which will propagate signal energy along its length. Further, light or light energy means energy at any frequency, such as in the optical infrared region or higher frequency region, which can be propagated through the optical fiber as defined. The focal point may be defined as a point on the optical axis through which every ray, which enters the lens parallel to the optical axis, passes.

Waveform 16, passed to input end 30 of optical fiber 32, is propagated along the length of the fiber to a partial reflector 34 which reflects a portion of the energy back to structure 20 and which permits the remaining portion of the energy to be transmitted to end 36 of the fiber. A mirror 38 is placed at end 36 to reflect the remaining energy portion also back to structure 20. In the use of test unit 10, reflectors 34 and 38 are placed at sites of simulated targets which are spaced from one another, for example, a minimum distance to test the resolution of the rangefinder, that is, its capability to distinguish two targets.

Figure 2:
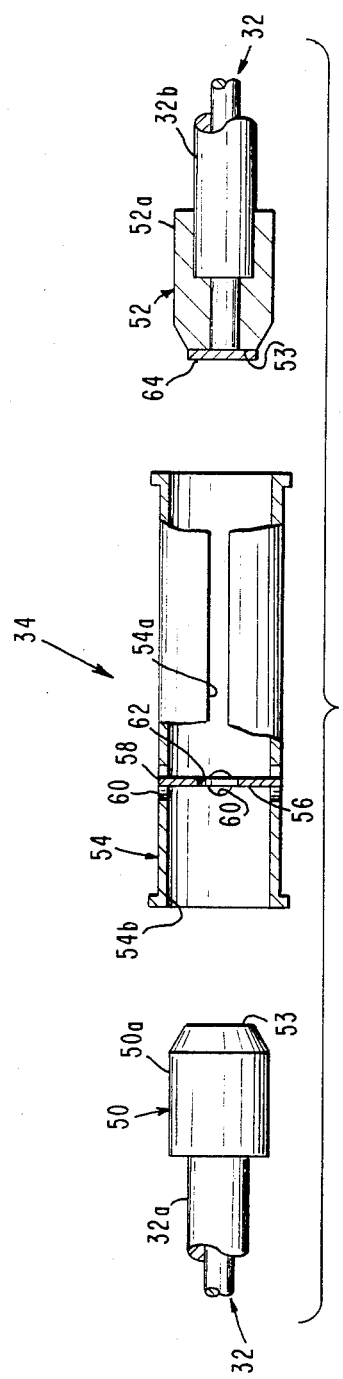
FIG. 2 is a view in partial cross-section of the preferred means for providing an aligned discontinuity in the optical fiber depicted in FIG. 1.

As more fully described with respect to FIG. 2, reflector 34 is semi-reflective, while mirror 38 is fully reflective so that portions of the light energy are passed back through the length of the fiber from both reflectors 34 and 38, thus providing for the time delays necessary to simulate two target returns and to allow time for the laser receiver to recover from any electrical transients produced by the laser transmitter when it is fired.

Upon arriving back at optical structure 20, the reflected light rays re-enter optical surface 24, undergo a series of reflections similar to those that occurred before entering the optical fiber 28, and emerge from optical structure 20 at its second end 40 of first surface 22 as collimated beams 42 parallel to the input beam 18. These beams are then introduced into laser rangefinder receiver 14 to produce simulated range return pulses for the two targets at their sites defined by reflectors 34 and 38. It should also be noted that all collimated light rays, entering the thick lens structure 20 at any point along its surface and passing to the focal point 38 and then back out of the lens structure, are parallel and have the same time delay in the lens structure. Surface 22 may be curved; nevertheless, the input and output beams 18 and 42 remain parallel.

It is an object of the present invention that there be the smallest loss of energy at reflector 34. Preferably, this condition for low-loss reflection and transmission is accomplished by use of the invention described in copending patent application, Ser. No. 65,032 filed Aug. 9, 1979. That invention provides an interconnection between single optical fiber conductors or waveguides with precise alignment therebetween. Specifically, as shown in FIG. 2, fiber 32 is cleaved to form a pair of fiber termini or ends 32a and 32b. A pair of guide bushings 50 and 52 having precise outer dimensions 50a and 52a are secured respectively to termini 32a and 32b and the termini and bushing ends at surfaces 53 are optically polished.

Bushings 50 and 52 are adapted for insertion into a tube or alignment sleeve 54 of resilient material which is split at 54a and which has a precisely dimensioned inner diameter 54b. The bushings are slightly oversized with respect to the sleeve so that the optical fiber termini, being concentric with the bushings, are precisely interconnected and aligned when the bushings are inserted into their common alignment sleeve.

Physical contact between the coupled fiber optical termini is prevented by a flate annular shim 56 which is loosely secured to and within the split tube, for example, by coopertion between ears 58 on the shim residing within holes 60 of the split tube. Shim 56 has a central hole 62 which is larger in diameter than that of fiber 32 to avoid any undesired attenuation in the energy.

On one of surfaces 53 of bushings 50 and 52 is placed a coating 64 of a reflective material, preferably gold, although silver or any other reflective material may be used. The coating may be placed on surface 53 by dipping end 32a or 32b of the optical fiber and its bushing into a solution containing a proportion of the reflective material and a liquid carrier in those quantities which will enable one to obtain the desired partial reflective qualities of the coating. The combined optical fiber end and the bushing are then removed from the solution and are heated to evaporate the solvent and thereby to leave a thin film of reflective material deposited on surface 53. It is to be understood that any other suitable coating process may be used, such as vacuum deposition or sputtering. The amount of reflective conducting material placed on the surface is in the range of 20 Å to 200 Å thick and is controlled to provide the desired partial reflection of energy. A similar reflective layer can be produced by multiply coating with dielectric materials of different indices of refraction so as to produce the proper partial reflection.

While the preferred method and technique of alignment comprises the invention of copending application, Ser. No. 65,032, any other suitable means may be utilized. In addition, while a coating reflective material is the preferred medium for effecting partial reflection, a similar result may be effected by decreasing opening 62 of shim 56 to be less than the diameter of optical fiber 32.

Although the invention has been described with reference to a particular embodiment thereof, it should be realized that various changes and modifications may be made therein without departing from the spirit and scope of the invention.

What is claimed is:

1. A test system for a laser rangefinder having signal transmission and reception paths comprising:
    an optical structure having a first surface with a focal point thereon and a second surface disposed to receive energy from said signal transmission path and to transfer energy to said signal reception path;
    optical waveguide means having a first end at said focal point and a second end with substantially fully reflective means thereon; and
    partially reflective means positioned intermediate said first and second optical waveguide ends for reflection of a portion of the energy and for permitting transmission of substantially the remaining portion of the energy to said second end.

2. A test system according to claim 1 in which said partially reflective means comprises a coating of reflective material having a thickness sufficient for enabling the energy portions to be reflected and transmitted.

3. A test system according to claim 2 in which said partially reflective means further comprises at least one discontinuity in said optical waveguide means defining a pair of spaced optical fiber ends with said coating placed on one of said fiber ends, and means optically aligning said fiber ends.

4. A test system according to claim 1 further comprising:
 a discontinuity of said optical waveguide means defining a pair of spaced optical fiber ends with said partially reflective means positioned adjacent thereto;
 bushings securely coupled respectively to said optical fiber ends, each of said bushings having a precisely dimensioned periphery for mechanically enlarging each of said optical fiber ends;
 a longitudinally split sleeve of resilient material having a precisely dimensioned interior which is precisely mated to said precisely dimensioned peripheries of said bushings, with the dimension of the sleeve interior being slightly smaller than the peripheral dimensions of said bushings to enable radial expansion of said sleeve upon opening of the longitudinal split when said bushings are inserted therein for alignment of said optical fiber ends; and
 means loosely secured to and within said sleeve and adjustably contactable with said bushings for spacing said optical fiber ends from mutual physical contact.

5. A test system according to claim 4 in which said optical fiber ends extend flush with terminal faces of said bushings and said spacing means comprises a shim having an opening therein contactable with said terminal faces, said opening being aligned with said optical fiber ends for spacing said optical fiber ends from the physical contact.

6. A test system according to claim 5 in which said partially reflective means comprises the shim opening being smaller than said optical fiber ends.

7. A test system according to claim 5 in which said partially reflective means comprises a coating of reflective material on one of said fiber ends having a thickness sufficient for enabling the energy portions to be reflected and transmitted.

8. A system for detecting a plurality of targets positioned at different sites by electromagnetic energy comprising means for transmitting and receiving the energy, means for conducting the energy along a single path extending to and from each of the target sites respectively to forward the energy from said transmitting means and to return the energy to said receiving means, substantially fully reflective means terminating said conducting means at the last of the target sites for returning the energy therefrom back through said energy conducting means, and partially reflective means positioned in the path at each of the remaining target sites preceeding the last target site for reflection of a portion of the energy also for returning the energy therefrom back through said energy conducting means and for permitting transmission of substantially the remaining portion of the energy to the next succeeding target site.

9. A system according to claim 8 in which said partially reflective means comprises a coating of reflective material at each of the remaining target sites having a thickness sufficient for enabling the energy portions to be reflected and transmitted.

10. A system according to claim 9 in which said coating comprises gold.

11. A system for detecting a plurality of targets positioned at different sites by electromagnetic energy comprising:
 means for conducting the energy along a single path extending to each of the target sites;
 substantially fully reflective means terminating said conducting means at the last of the target sites; and
 partially reflective means positioned in the path of each of the remaining target sites preceeding the last target site for reflection of a portion of the energy and for permitting transmission of substantially the remaining portion of the energy to the next succeeding target site, and comprising a pair of spaced optical fiber ends, a coating of reflective material which has a thickness sufficient for enabling the energy portions to be reflected and transmitted and which is placed on one of said fiber ends, and means optically aligning said optical fiber ends.

12. A system for detecting a plurality of targets positioned at different sites by electromagnetic energy comprising:
 means for conducting the energy along a single path extending to each of the target sites;
 substantially fully reflective means terminating said conducting means at the last of the target sites; and
 partially reflective means positioned in the path at each of the remaining target sites preceeding the last target site for reflection of a portion of the energy and for permitting transmission of substantially the remaining portion of the energy to the next succeeding target site, each of the remaining target sites comprising
  a pair of spaced optical fiber ends with said partially reflective means positioned adjacent thereto,
  bushings respectively securely coupled to said optical fiber ends, each of said bushings having a precisely dimensioned periphery for mechanically enlarging each of said optical fiber ends,
  a longitudinally split sleeve of resilient material having a precisely dimensioned interior which is precisely mated to said precisely dimensioned peripheries of said bushings, with the dimension of the sleeve interior being slightly smaller than the peripheral dimensions of said bushings to enable radial expansion of said sleeve upon opening of the longitudinal split when said bushings are inserted therein for alignment of said optical fiber end, and
 means loosely secured to and within said sleeve and adjustably contactable with said bushings for spacing said optical fiber ends from mutual physical contact.

13. A method for detecting a plurality of targets positioned at different sites in at least one serial group thereof by electromagnetic energy comprising the steps of:
 positioning a substantially full reflector of the energy at the site of the last of the targets to be detected in the serial group;
 utilizing partial reflectors at the sites of the remaining targets having the capability of partially reflecting a portion of the energy and of permitting transmission of substantially the remaining portion of the energy to the next target site; and
 transmitting and reflecting the energy serially to and from the target sites in their serial group along a common path.

14. A method according to claim 13 further comprising the steps of utilizing optical fiber means for effecting said transmitting step, and placing partially reflective material on the optical fiber means in the path of the energy for effecting said partial reflection.

15. A method for detecting a plurality of targets positioned at different sites in at least one serial group thereof by electromagnetic energy transmitted through optical fiber means comprising the steps of:

positioning a substantially full reflector of the energy at the site of the last of the targets to be detected in the serial group;

utilizing partial reflectors of suitable material placed on the optical fiber means in the path of the energy of the energy and at the sites of the remaining targets, the material having the capability of partially reflecting a portion of the energy and of permitting transmission of substantially the remaining portion of the energy to the next target site;

spacing the optical fiber means at each of the sites to provide ends thereof;

utilizing a coating of the reflective material on one of the ends of the optical fiber means;

optically aligning the ends; and transmitting the energy through the optical fiber means serially to the target sites in their serial group.

16. A method according to claim 15 further comprising the step of placing the coating on the end by the process of vacuum deposition or sputtering.

17. A method according to claim 15 further comprising the step of placing the coating on the end by dipping the one end into a solution of the reflective material, an adhesive and a solvent of proper proportion to obtain a coating thickness sufficient to provide the partial reflection, removing the end from the solution, and evaporating the solvent.

18. A method according to claim 17 further comprising the steps of utilizing gold as the reflective material.

* * * * *